United States Patent

Conrad

[11] Patent Number: 5,269,893
[45] Date of Patent: Dec. 14, 1993

[54] METHOD OF POWERING CORONA DISCHARGE IN OZONE GENERATORS WITH BIPOLAR PULSES AND A PRECHARGE PULSE

[76] Inventor: Richard H. Conrad, 1482 Vistazo West, Tiburon, Calif. 94920

[21] Appl. No.: 887,341

[22] Filed: May 21, 1992

Related U.S. Application Data

[63] Continuation-in-part of Ser. No. 538,205, Jun. 14, 1990, Pat. No. 5,130,003.

[51] Int. Cl.$^5$ ............................................. C01B 13/10
[52] U.S. Cl. ............................. 204/176; 422/186.16
[58] Field of Search ................. 204/176, DIG. 9; 422/186.15, 186.16, 186.21; 250/324; 323/903; 361/235, 213

[56] References Cited

U.S. PATENT DOCUMENTS 4,002,921 1/1977 Lowther ............................ 307/43
4,314,321 2/1982 Galliker ............................ 363/10

Primary Examiner—William H. Beha, Jr.
Attorney, Agent, or Firm—Larry D. Johnson

[57] ABSTRACT

A method employing a precharging pulse to adjust and/or to equalize the peak voltages of a discontinuous bipolar pulse waveform used for powering a corona in an ozone generator system. This precharging pulse is generally opposite in polarity to the first unipolar pulse of the bipolar pulse waveform, and precharges the inductances and capacitances of the system to provide priming energy for the first corona pulse and to compensate for skewing of the waveform due to resonances. This method enables the corona to be operated at the optimum voltage for efficient ozone generation, and provides the ability to fine-tune each system to best match high-voltage transformers to corona cells.

20 Claims, 4 Drawing Sheets

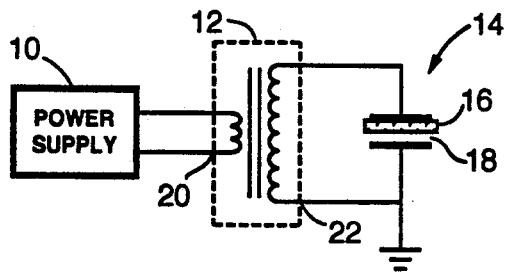
FIG. 1
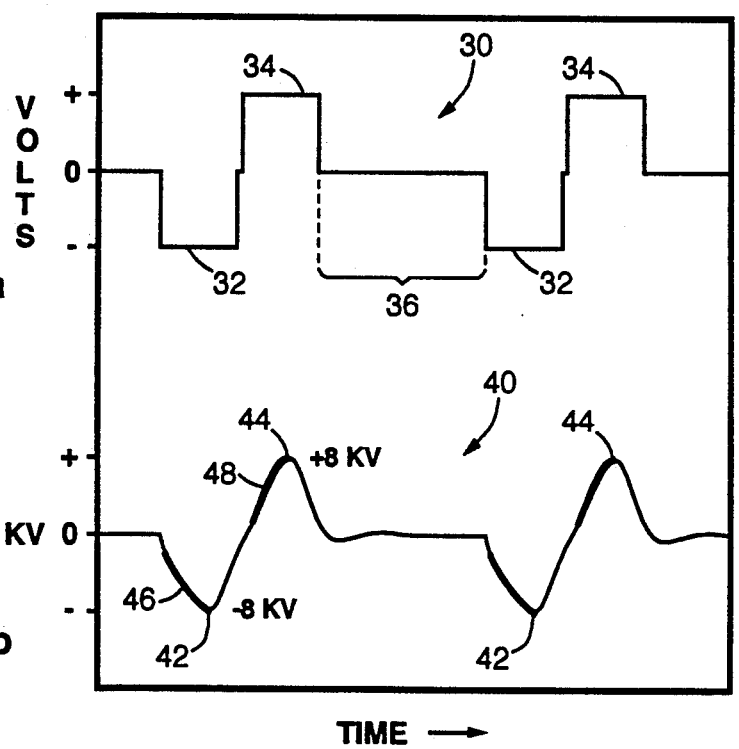
FIG. 2a
FIG. 2b
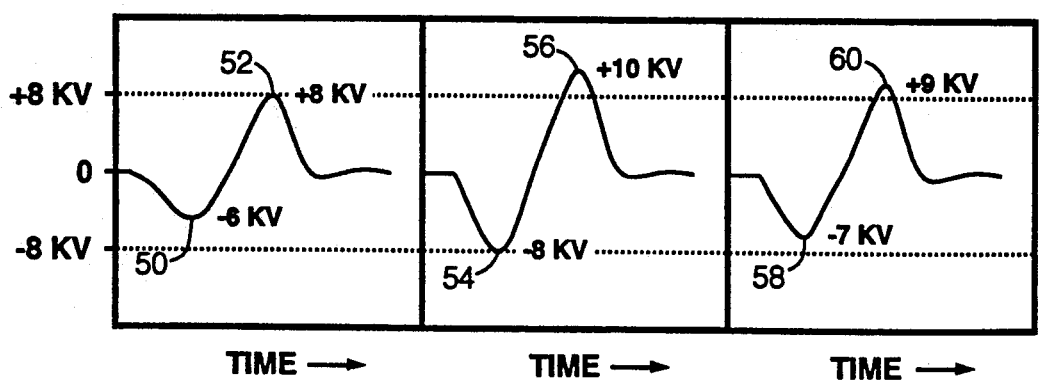
FIG. 2c    FIG. 2d    FIG. 2e

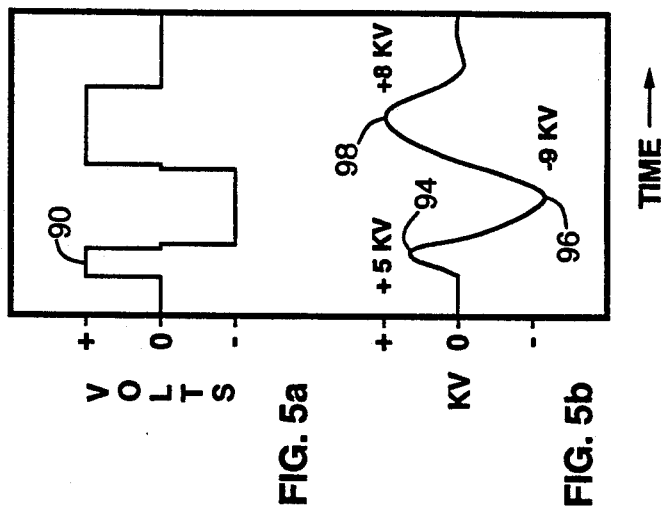
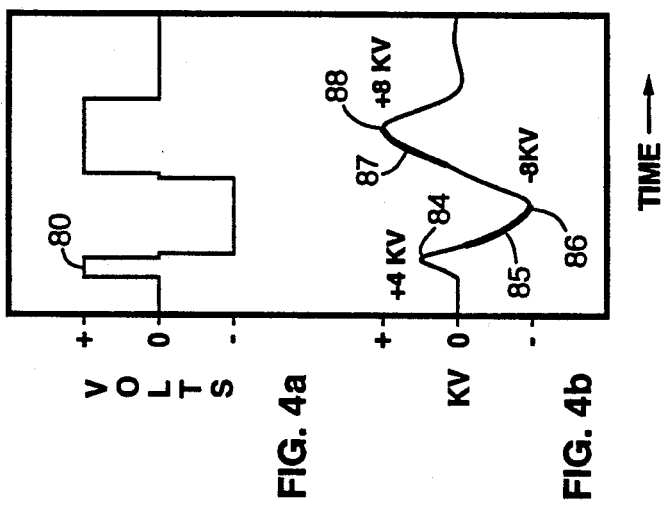
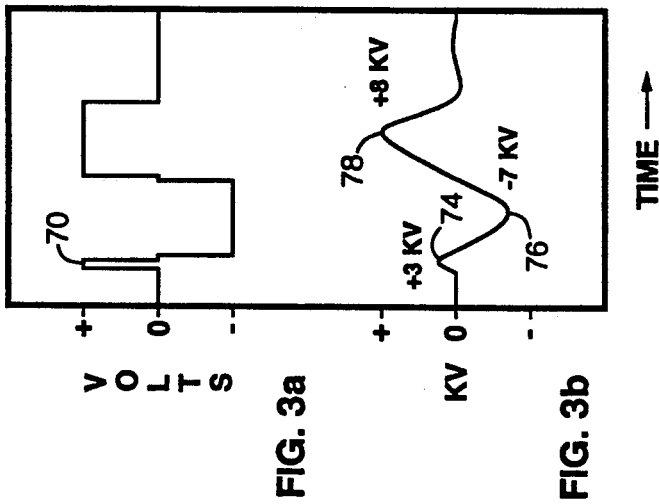

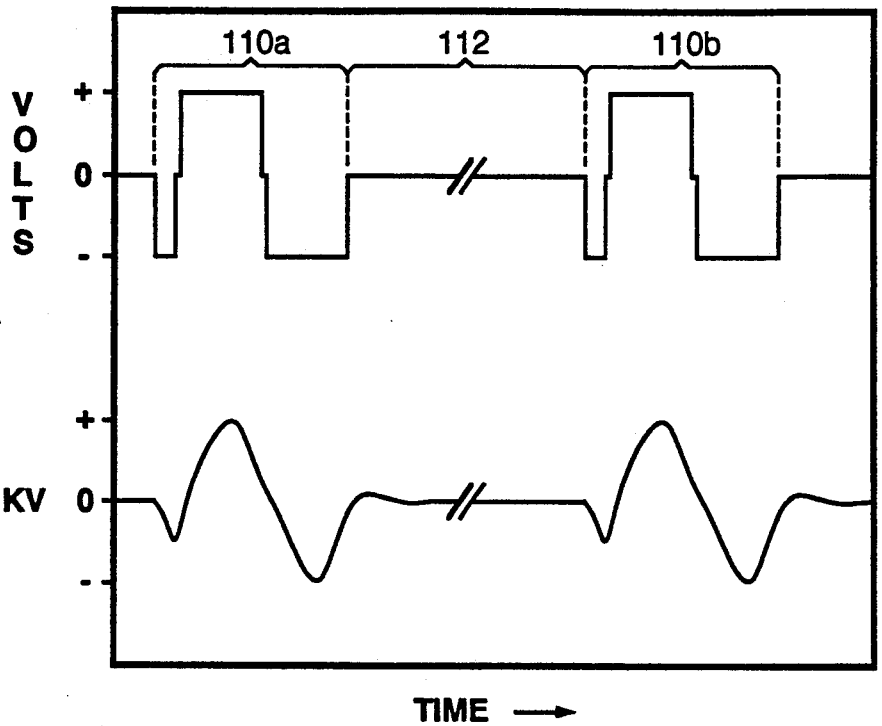
FIG. 6a
FIG. 6b
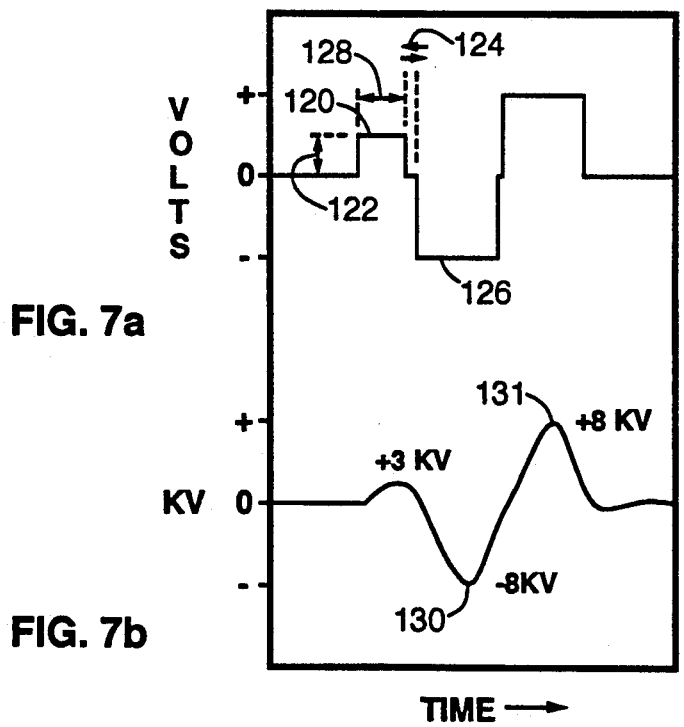
FIG. 7a
FIG. 7b

METHOD OF POWERING CORONA DISCHARGE IN OZONE GENERATORS WITH BIPOLAR PULSES AND A PRECHARGE PULSE

This application is a continuation-in-part of copending patent application Ser. No. 07/538,205, filed Jun. 14, 1990, now U.S. Pat. No. 5,130,003 for a METHOD OF POWERING CORONA DISCHARGE IN OZONE GENERATORS.

BACKGROUND OF THE INVENTION

1. Field of the Invention

This invention relates generally to methods and apparatus for supplying electrical power to ozone generators, and more specifically to a method for adjusting the peak amplitudes of discontinuous waveforms for powering corona discharge cells.

2. Description of the Prior Art

It is extremely desirable to be able to supply ozone generating cells with a high-voltage (KV) waveform in which the negative and positive peak voltages are identical or nearly so, because the most efficient ozone generation occurs over a relatively narrow voltage range. If the negative and positive KV peaks are unequal, then when one peak is at the optimum KV, the other will be either above or below the optimum. The higher the voltage, the greater is the potential for corona hot-spots which reduce ozone generation efficiency, particularly in the case of non-uniformities of the corona gap where the gap is narrower. In addition, as the voltage increases, dielectric breakdown and failure of transformer insulation become more likely both between secondary turns and from secondary to primary, and dielectric breakdown and parasitic arcing begin to occur within the corona cell. At higher voltages, more corona forms on the outer surfaces of the high-voltage transformer, high-voltage leads and the corona cell, particularly if the ambient air is moist and/or the surfaces are not clean. This external corona produces unwanted ozone outside of the corona cell which degrades these surfaces and can escape into the ambient air.

Thus, it is desirable to drive the corona at the lowest peak KV possible. On the other hand, if the peak KV is too low, the corona will not ignite evenly in all areas, especially if there are non-uniformities where the gap is wider. The range of optimum peak KV for the most efficient ozone generation begins somewhat above the minimum KV necessary to produce a stable corona, and ends below where corona hot spots begin to occur. This optimum range becomes narrower and more critical as the corona gap becomes less uniform.

The use of a discontinuous bipolar pulse waveform (e.g., the single-cycle bipolar pulse described in the copending patent application) for powering corona discharge in ozone generators has many advantages. However, in some systems this waveform introduces a new problem which does not occur with conventional continuous-wave waveforms: an inequality of the peak KVs. When supplying the primary of the transformer with a symmetrical voltage bipolar pulse squarewave, the overall maximum level of KV output from the secondary of the transformer to the ozone generating cell(s) can be adjusted by varying the amplitude and/or pulse width of the primary bipolar squarewave. The actual KV peaks of the output will not always be equal in amplitude, e.g., the positive KV peak will often be higher than the negative KV peak (except for particular combinations of transformer inductance and capacitance, corona cell capacitance, and bipolar pulse width). Normally the second KV peak will be higher than the first, because it has the advantage of being the second swing of the "pendulum". In other words, part of the energy of the first pulse goes into charging up the LCR (inductance, capacitance and resistance) circuit, and then when the polarity swings into the second pulse some of this charge carries over, allowing the second pulse to swing higher than the first. This energy is then dissipated by the corona current and to a much smaller extent by damped oscillations of the capacitative current. After a dead time interval between bipolar pulses, the next first pulse has to start from scratch again. Furthermore, the inductance, capacitances, impedance, reactance and pulse widths often interact to create resonances which result in a skewing of the waveform and its peak voltages. The difference between the peak voltages can change when any of the above variables change. Attempting to adjust the ratio of the KV peaks (by making the amplitudes or widths of the unipolar pulses of the bipolar pulse which supply the transformer different) introduces complexity into the power supply, especially if a continuous type of adjustment is used. In addition, introducing a difference in unipolar pulse amplitudes or widths usually creates more skewing than it can cure.

SUMMARY OF THE INVENTION

The present invention provides an apparatus and method for adjusting and/or equalizing the peak KV amplitudes of the discontinuous bipolar pulse described in the copending patent application by introducing an additional pulse in front of each bipolar pulse to precharge the LCR circuit of the system. This generally unipolar precharging pulse is generally opposite in polarity to the polarity of the first unipolar pulse of the bipolar pulse. It equalizes the negative and positive KV peaks by giving a head start to the first unipolar pulse of the bipolar pulse. It not only provides a similar precharge for the first unipolar pulse of the bipolar pulse that the first unipolar pulse does for the second, but it can also compensate for waveform skewing due to resonances.

Both unipolar pulses of the bipolar pulse directly excite a corona current, but the precharging pulse generally does not directly create corona because its peak KV is usually set below the corona ignition threshold. Thus, the precharging pulse does not interfere with the benefit of having the first unipolar pulse of the bipolar pulse negative with respect to the dielectric electrode as described in the copending patent application. The precharging pulse does not waste power because its energy is stored in the LCR circuit, and is then used by the corona discharge during the bipolar pulse. The precharging pulse is easy and inexpensive to implement, is able to provide a continuum of adjustability, and can even provide an automatic on-going adjustment to compensate for changes which occur while the system is in operation.

The ability to adjust the peak KVs of the corona-generating pulses to be equal to each other allows the system to maintain a higher efficiency of ozone generation, in spite of the inevitable loose tolerances in corona gap width uniformity (which narrow the range of efficient peak KV). The peak KV equalization also enables the system to avoid peak voltages that are higher than necessary, which not only minimizes the high-voltage stress on all components for longer life, but is safer, minimizes arcing and external corona, and decreases the cost of the transformer. The average corona current, which determines the amount of ozone generated, is controlled by varying the pulse repetition rate of the bipolar pulse rather than by changing the KV. The overall maximum bipolar peak KV itself is preferably held constant by automatic feedback regulation.

(The terms "primary voltage waveform" and "secondary voltage waveform" are defined as follows: the primary voltage waveform is the waveform fed into the primary, or low voltage side of the transformer, and the secondary voltage waveform is the primary voltage waveform as transformed by the transformer and fed into the corona cell from the secondary, or high-voltage side, of the transformer.)

The precharging pulse of the primary voltage waveform, the primary precharging pulse, is generally either shorter in duration than either of the two unipolar pulses of the bipolar pulse, or of lower voltage, or both. It is generally opposite in polarity to the polarity of the first unipolar pulse. The resulting triplet of unipolar pulses, upon emerging from the secondary of the transformer as the high-voltage waveform, will then consist first of the secondary precharging pulse, whose peak KV is usually below corona threshold, closely followed by the secondary bipolar pulse KV waveform which drives the corona. The relative peak KV's of the negative and positive unipolar pulses of the secondary bipolar pulse are adjustable towards equality by varying the width (and/or height and/or dead time interval before the bipolar pulse) of the primary/secondary precharging pulse.

The high-voltage transformer is able to translate a shortened input pulse width (of the primary precharging pulse) into a lower peak KV (of the secondary precharging pulse waveform) because the primary precharging pulse widths employed are generally shorter than the LCR time-constant of the overall system. The easiest way to adjust the amount of precharging that occurs is to adjust the pulse width of the precharging pulse that is fed into the primary of the transformer. Either the leading edge or the trailing edge or both edges of the precharging pulse can be adjusted, but the leading edge is usually preferred, which adjusts without varying the dead time interval between the trailing edge of the precharging pulse and the leading edge of the bipolar pulse. Under certain conditions it may be desirable to extend the normally short dead time interval between the precharging pulse and bipolar pulse. Primary precharging pulse widths might range between approximately 0.1 and 100 microseconds (typically from five percent to fifty percent of the unipolar pulse width), with typical primary precharging pulse to bipolar pulse dead time intervals also ranging between 0.1 and 100 microseconds. In addition, or alternatively, the voltage amplitude of the precharging pulse fed into the primary of the transformer could be varied to control the amount of pre-charge.

The adjustable precharging pulse, especially together with a primary bipolar pulse whose amplitude (and optionally also pulse width) is adjustable, provides the very valuable ability to fine-tune each bipolar pulse system configuration for maximum efficiency of ozone generation. It allows the optimum matching of the power supply, transformer, and corona cell(s) to each other. This is an extremely important asset because it creates the flexibility to change the size or number of corona cells, or to interchange different system components, whether they be replacement parts with different tolerances or specifications, or new designs. It also enables a continuous on-going automatic adjustment of relative peak voltages which can compensate for changes in resonance peaks due to fluctuating LCR values caused by variations in temperature, feed gas composition, pressure, flow rate, etc. If further compensation is required, the ratio of the pulse widths and/or of the pulse heights of the unipolar pulses of the bipolar pulse can also be varied to some extent. On the other hand, corona power supplies employing conventional waveforms usually have matching problems even when the waveform is a continuous wave. Large inductors are often used for matching in these systems, and they are bulky, expensive, waste power, and usually do not have a continuum of adjustment, if they are adjustable at all. The method of the present invention eliminates these problems.

The peak voltage ratio adjusting effect of the precharging pulse is not due to an ionization mechanism because the precharging pulse carries out its function in a continuous manner well below corona ignition threshold voltage. Furthermore, the effect of the precharging pulse is not due to any de-ionization (ion neutralization) phenomena because its influence on the peak KVs of the bipolar pulse is the same at extremely low repetition rates (low duty cycle) with high feed gas flow, where residual ionization between bipolar pulse pulses would be nil, as it is at full power high repetition rate (high duty cycle) and moderate feed gas flow. Nor does the precharging pulse alter the threshold voltage for corona ignition in either unipolar pulse of the bipolar pulse. This threshold remains identical in both unipolar pulses of the bipolar pulse, independent of the presence or absence of the precharging pulse.

BRIEF DESCRIPTION OF THE DRAWINGS

FIG. 1 is a simplified schematic diagram of an ozone generator system and illustrates the components which are the major sources of inductance, capacitance and resistance;

FIG. 2 illustrates the bipolar pulse waveform described in the copending patent application, with FIG. 2a showing the primary voltage waveform, FIG. 2b showing an ideal secondary voltage waveform and defining the time periods during which the corona is ignited, and FIGS. 2c–e showing other possible secondary voltage waveforms;

FIG. 3a displays the addition of a very narrow precharging pulse to the primary waveform, and FIG. 3b shows the resulting secondary waveform;

FIG. 4a displays the addition of a wider precharging pulse to the primary waveform, and FIG. 4b shows the resulting secondary waveform, which is the preferred waveform because the bipolar pulse KV peaks are now adjusted to be equal in amplitude;

FIG. 5a displays the addition of a yet wider precharging pulse to the primary waveform, and FIG. 5b shows the resulting secondary waveform;

FIG. 6a and 6b illustrate the same waveforms as FIGS. 4a and 4b except with the polarities reversed and with two complete waveform cycles shown;

FIG. 7a shows the use of a precharging pulse whose primary voltage amplitude and/or dead time interval and/or width is varied, with FIG. 7b being the resulting preferred secondary waveform;

DETAILED DESCRIPTION OF A PREFERRED EMBODIMENT

Figure 8B:
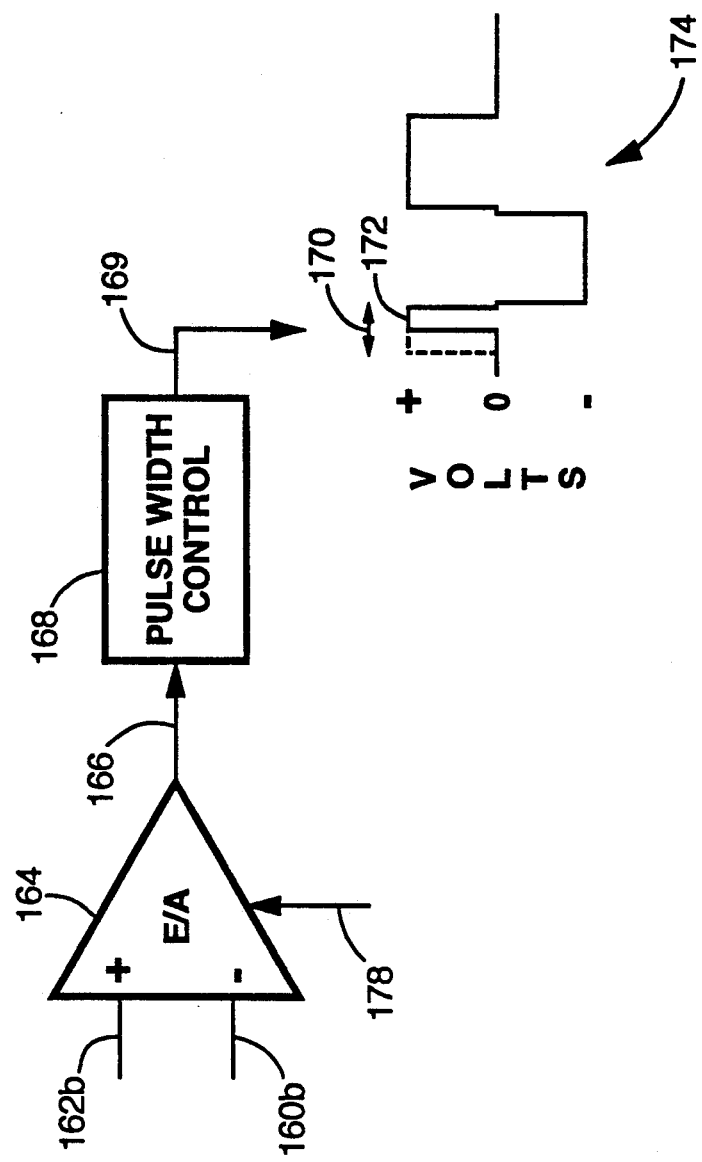
FIG. 8b is a schematic diagram of a feedback control scheme for automatically maintaining a fixed ratio of secondary peak KV bipolar pulse amplitudes.

In the following description, "positive" generally signifies a positive voltage polarity as supplied to the dielectric electrode, which is usually the electrode of high-voltage potential (in contrast to a grounded electrode). In cases where either both or neither electrode is dielectric, "positive" signifies a positive voltage as supplied to the electrode which is not grounded. "Negative" simply signifies the opposite polarity from the positive. In all of the figures, the + and − signs can be reversed.

FIG. 1 illustrates a typical ozone generator system, including power supply 10, high-voltage transformer 12, and corona cell 14. The inductance (L) and capacitance (C) of transformer 12, and the capacitances of corona cell 14, together with their associated impedance, reactance, and resistance (R), form an LCR loop which often creates resonances and ringing which can be complex in nature due to the non-linear behavior of the corona cell. The corona cell is actually two capacitances in series, that of the dielectric 16, which is fixed, and that of the corona gap filled with feed gas 18, which has one capacitance and a nearly infinite resistance when the corona is off, and another capacitance and a reduced resistance while the corona is ignited. FIG. 1 additionally shows the primary (input side) 20 and secondary (high-voltage output side) 22 of the transformer. As the secondary KV driving the corona cell increases from zero, it charges up the LCR elements in one direction until the voltage field and dV/dt across the corona gap exceeds the corona ignition threshold, at which time the feed gas becomes ionized, begins to conduct electricity and to generate ozone.

FIG. 2a illustrates bipolar pulse squarewave waveform 30 which drives primary 20 of the transformer, showing first unipolar pulse 32 and second unipolar pulse 34. Two cycles of the waveform are shown in order to illustrate time interval 36 between bipolar pulses. FIGS. 2b-e show several possible resultant transformer secondary output waveforms, which drive the corona cell. FIG. 2b illustrates the ideal corona-driving high-voltage bipolar pulse waveform 40 with equal negative peak 42 (−8 KV) and positive peak 44 (+8 KV), and also showing the time periods during which the corona is ignited as thickened curve portions 46 and 48. In this particular ozone generating system, the corona first ignites when the KV of the largest peak is 6 KV, and the optimum KV for efficient ozone generation is a peak KV of 8 KV. FIGS. 2c-e illustrate secondary KV waveforms produced in this system when the voltage amplitude of the primary bipolar pulse squarewave is varied. The waveform of FIG. 2c has a +KV peak 52 of 8 KV, but a −KV peak 50 which is too low, and the waveform of FIG. 2d has a −KV peak 54 of 8 KV, but a +KV peak 56 that is too high. The waveform of FIG. 2e is the best compromise, with the −7 KV peak 58 being marginally low, and the +9 KV peak 60 being slightly higher than desirable. (In these and subsequent figures, the KV peaks can either lead or lag the trailing edge of each primary bipolar pulse.)

FIGS. 3-5 illustrate the preferred embodiment of this invention, showing the effect (on the secondary KV) of the addition of precharging pulses of three different widths to the primary voltage waveform. The precharging pulses and the unipolar pulses of the bipolar pulse act just like successive plucks on a resonant string, or taps on a pendulum: the precharging pulse is the first tap to set the pendulum (the LCR circuit) swinging, which helps the following tap, if it occurs in the opposite direction within the proper length of time, to be most efficiently used to cause the pendulum to reach its optimum amplitude. FIG. 3a displays a very narrow precharging pulse 70 added in front of the bipolar pulse of a primary waveform that alone, without the precharging pulse, would have produced a secondary waveform identical to FIG. 2c (which had a +KV peak of 8 KV, but a −KV peak of only −6 KV). FIG. 3b, the secondary waveform which results from FIG. 3a, has a secondary precharging pulse 74 of +3 KV, and a −KV peak 76 of −7 KV, which is an improvement over the −6 KV of FIG. 2c.

FIG. 4a has a wider precharging pulse 80 which results in the balanced −8 and +8 KV peaks 86, 88 of FIG. 4b, which is therefore the preferred waveform. The time periods during which the corona is ignited are shown in FIG. 4b as thickened curve portions 85 and 87.

FIG. 5a displays the addition of a yet wider precharging pulse 90 to the primary waveform, and FIG. 5b shows the resulting secondary waveform, where adjustment of the ratio of peak − and + KV amplitudes has gone too far, with the negative peak 96 reaching −9 KV. The numerical valves of peak KV shown in FIGS. 2 through 7 are only typical examples, and the method of this invention is not limited to any specific KV values.

FIGS. 6a and 6b are duplicates of FIGS. 4a and 4b respectively, except with the polarities reversed, and additionally showing two cycles of the waveforms to illustrate their discontinuous nature, with each triplet 110a, 110b separated by a time interval 112. Time interval 112 may be jittered as described in the copending patent application. Although the figures illustrate a precharging pulse which is opposite in polarity to the first unipolar pulse of the bipolar pulse, a precharging pulse of the same polarity as the first unipolar pulse of the bipolar pulse could alternatively be used to equalize the KV peaks provided that the length of the dead time interval between the precharging pulse and bipolar pulse were longer, but this strategy is generally less desirable because then the precharging pulse would be less effective, and because more of the dead time interval 112 between the triplets would be used up, thereby allowing less room for and flexibility of choice of pulse widths, pulse repetition rates, and broadness of jittering or dithering.

FIG. 7a illustrates adjustment of the primary precharging pulse 120 by varying the primary voltage amplitude 122 of the precharging pulse, and/or the dead time interval 124 between the precharging pulse and the first unipolar pulse 126 of the bipolar pulse, and/or the precharging pulse width 128. FIG. 7b shows that the secondary KV peaks 130, 131 can be equalized as well as in the waveform of FIG. 4b, but alternatively by using a primary waveform with a wider precharging pulse of lower amplitude than was used to produce the waveform of FIG. 4b.

Figure 8A:
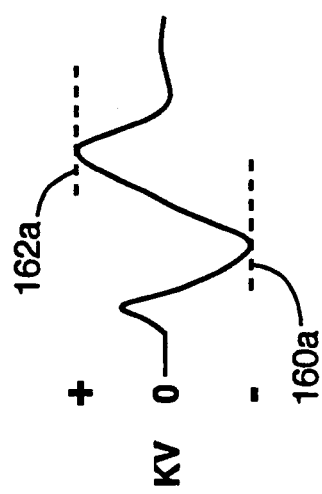
FIG. 8a is a secondary waveform of the present invention showing negative and positive peak voltages.

FIG. 8a is a secondary waveform of the present invention showing negative 160a and positive 162a high-voltage peak levels. FIG. 8b is a schematic diagram of an optional feedback circuit which monitors peak levels 160a and 162a as low-voltage sense signals 160b and 162b and inputs them into error amplifier 164. This error amplifier develops a difference signal 166 which is fed into precharging pulse control 168. Pulse control output 169 controls the width 170 of the precharging pulse 172 of primary waveform 174. (Precharging pulse control 168 can be built into power supply 10 of FIG. 1; pulse height and/or dead time interval could also be controlled.) The width of the precharging pulse is thereby automatically and continuously adjusted so as to maintain the secondary − and + KV peaks at a desired ratio. For example, if the + KV peak is initially higher than the − KV peak, the error amplifier will send a voltage representing this difference to the precharging pulse width control which causes the precharging pulse to become wider until the peaks approach equality. Alternatively, the peak KV ratio may be maintained at a value that is different than 1.0 by introducing an offset 178 as shown. This feedback circuit is not likely to be necessary in most systems. When employed, it is preferably used in conjunction with a means of automatically holding the overall maximum bipolar peak KV at a constant value.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. In a method of powering corona discharge in ozone generators having a power supply including a high-voltage transformer supplying power to a corona discharge cell, said method including the step of providing said high-voltage transformer with a single-cycle waveform input including discrete bipolar pulses each consisting of a pair of adjacent unipolar pulses of opposite polarity, each bipolar pulse separated from the next bipolar pulse by a time interval, with the width of said bipolar pulse and of said time interval providing a bipolar pulse repetition rate, the improvement comprising the step of:
   providing a generally unipolar precharging pulse preceding each said bipolar pulse, wherein said precharging pulse as provided to said high-voltage transformer affects the relative peak voltages of said power supplied to said corona discharge cell.

2. The method of powering corona discharge of claim 1 further including the step of:
   providing said precharging pulse with a polarity that is opposite to the polarity of the first of said unipolar pulses of said bipolar pulse.

3. The method of powering corona discharge of claim 1 further including the step of:
   providing said precharging pulse with a positive polarity.

4. The method of powering corona discharge of claim 1 further including the step of:
   providing said precharging pulse with a negative polarity.

5. The method of powering corona discharge of claim 1 further including the step of:
   adjusting the width of said precharging pulse.

6. The method of powering corona discharge of claim 5 further including the step of:
   adjusting the width of the precharging pulse to be between 5% and 50% of the width of each of the unipolar pulses of said bipolar pulse.

7. The method of powering corona discharge of claim 5 further including the step of:
   adjusting the width of the precharging pulse to be between 0.1 and 100 microseconds.

8. The method of powering corona discharge of claim 1 further including the step of:
   adjusting the amplitude of said precharging pulse.

9. The method of powering corona discharge of claim 1 further including the step of:
   adjusting the time interval between said precharging pulse and said bipolar pulse.

10. The method of powering corona discharge of claim 9 further including the step of:
    adjusting the time interval between said precharging pulse and said bipolar pulse to be between 0.1 and 100 microseconds.

11. The method of powering corona discharge of claim 1 further including the step of:
    jittering said pulse repetition rate.

12. In a method of powering corona discharge in ozone generators having a power supply including a high-voltage transformer supplying power to a corona discharge cell, said method including the step of providing said corona discharge cell with a single-cycle waveform input including discrete bipolar pulses each consisting of a pair of adjacent unipolar pulses of opposite polarity, each bipolar pulse separated from the next bipolar pulse by a time interval, with the width of said bipolar pulse and of said time interval providing a bipolar pulse repetition rate, the improvement comprising the step of:
    providing a generally unipolar precharging pulse preceding each said bipolar pulse, wherein said precharging pulse as provided to said corona discharge cell affects the relative peak voltages of said bipolar pulse supplied to said corona discharge cell.

13. The method of powering corona discharge of claim 12 further including the step of:
    providing said precharging pulse with a polarity that is opposite to the polarity of the first of said unipolar pulses of said bipolar pulse.

14. The method of powering corona discharge of claim 12 further including the step of:
    providing said precharging pulse with a positive polarity.

15. The method of powering corona discharge of claim 12 further including the step of:
    adjusting the width of said precharging pulse.

16. The method of powering corona discharge of claim 12 further including the step of:
    adjusting the amplitude of said precharging pulse.

17. The method of powering corona discharge of claim 12 further including the step of:
    adjusting the time interval between said precharging pulse and said bipolar pulse.

18. The method of powering corona discharge of claim 12 further including the step of:
    adjusting the peak amplitude of said precharging pulse as supplied to said corona cell to be less than the peak amplitude of each of said unipolar pulses of said bipolar pulse as supplied to said corona cell.

19. The method of powering corona discharge of claim 12 further including the step of:

controlling said precharging pulse to maintain a generally constant ratio of said relative peak voltages of said bipolar pulse supplied to said corona discharge cell.

20. The method of powering corona discharge of claim 12 further including the step of:
jittering said pulse repetition rate.

* * * * *